Patented May 15, 1951

2,553,467

UNITED STATES PATENT OFFICE 2,553,467

PROCESS FOR THE MANUFACTURE OF A COMPLETELY SOLUBLE HIGHLY NUTRIENT PRODUCT IN POWDER FORM

Ferdinand Neef, Zurich, Switzerland

No Drawing. Application September 13, 1947, Serial No. 773,930. In Switzerland November 28, 1946

13 Claims. (Cl. 99—71)

Flavoured and completely soluble preparations in powder form are known which dissolve on being placed in aqueous liquids. Although beverages are thereby produced which are agreeable in taste, the said beverages are poor in nutrient substances and can therefore be regarded as stimulants only.

Various processes for the manufacture of preparations in powder form have become known by which extracts from coffee or tea are converted to the dry state. The majority of these processes have this feature in common, that the conversion of the flavouring extracts to a state of dryness is carried out by distillation in vacuo. More advanced methods of manufacture have as their object the retention of, or imparting of keeping qualities to, the flavouring substances contained in the beverage-producing powder. As has already been mentioned, these processes are limited to beverages which are stimulants only. The object of the present invention is a process for the manufacture of a completely soluble, highly nutrient product in powder form which subsequently, by the addition of aqueous liquids, yields a beverage containing a stimulant, in particular coffee or tea. The said process is characterized by the fact that a flavouring extract obtained by lixiviation with an aqueous solution of an organic acid is concentrated, the acid contained in the said extract is neutralized, the flavouring extract so treated is mixed with sugar and with substances produced from milk, the whole is treated with an alkalinely reacting reaction solution in order to prevent the rising and precipitation of fatty substances, and the whole is converted to dryness.

The flavouring extract is suitably produced with the aid of citric acid, in particular from vegetable products, the acid in the extract being neutralized by means of a sodium salt, the extract being combined with sugar, powdered milk and malt extract and treated with the alkalinely reacting reaction solution, which can consist of an organic acid and a sodium salt. The flavouring extract can be obtained by means of a plurality of lixiviations, in which case a first extraction is suitably carried out by lixiviation of the vegetable products with citric acid, and subsequent neutralization, a second by lixiviation of the residues precipitated during the first extraction and a repetition of the neutralizing process by means of a sodium salt, and finally a third extraction by lixiviation of the previously produced extracts with freshly roasted and ground vegetable products under the influence of citric acid, followed by neutralization by a sodium salt. The third extract, which, for further lixiviation and further strengthening of the flavour, is poured over freshly roasted and ground fruit, is dissolved in sugar for the purpose of stabilizing the extract and preserving the flavour. The extract, lixiviated with sugar and subsequently neutralized, is combined with sugar, full-cream milk-powder, milk and malt extract by being boiled and simultaneously subjected to the action of the alkalinely reacting reaction solutions. The combination of the acid-lixiviated and subsequently neutralized extract with sugar, full-cream milk-powder, milk and malt extract is carried out by boiling and subjection to the action of the reaction solution composed of sodium phosphates and citric acid. The said alkalinely reacting reaction solution is advantageously produced from sodium citrate, sodium biphosphate and citric acid. The flavouring extract can be manufactured by the lixiviation and subsequent deacidification of coffees of differing origin, it being advisable in this case to treat each type of coffee individually. Suitable initial materials for the flavouring extracts, in addition to coffee, are caffein-free coffee, and tea.

First typical embodiment 4 kilogrammes of barley malt are shredded and mixed with 4 litres of water, being then left to macerate. A further quantity of 6 litres of water is then added, where-upon the whole is boiled up to a temperature of 100° C. and subsequently, after the insoluble cellulose components have been pressed out, concentrated to about 36° B. (Baumé). This concentration yields about 2½ kilogrammes of malt extract, which is mixed with 1½ kilogrammes of sugar. Independently, 2 kilogrammes of coffee are finely ground and lixiviated with 3 litres of hot water to which 35 grammes of acidum citricum have been added. The resulting coffee extract is heated to approximately 50° C. and 20 grammes of sodium carbonicum are added, this bringing about the neutralization of the acid, originating from the acidum citricum, contained in the coffee extract. The coffee residue remaining from the pressing process is again placed in three litres of water, and to intensify the lixiviatory action 40 grammes of acidum citricum are added. The second coffee extract from the coffee residue is treated with 200 grammes of water in which 25 grammes of sodium carbonicum are dissolved. Once again the sodium carbonicum brings about the neutralization of the acid contained in the second coffee extract. The neutralized second coffee extraction is then pressed out. The coffee extractions are mixed together and 150 grammes of burnt sugar are then dissolved in them. Thereupon the whole is heated up to 75° C. for the purpose of stabilizing the coffee extract and binding the flavour. This sugared extract is again poured over 500 grammes of freshly roasted, finely ground coffee, whereby it absorbs the flavour from the latter and is then pressed. Independently, 1 kilogramme of powdered skimmed milk is beaten up in 1½ kilogrammes of malt extract, a solution being added consisting of 20 grammes of acidum citricum and 40 grammes of sodium carbonicum, to restrict rising during the dry distillation process, that is to say, the conversion to the dry state. The resultant mixture of coffee extract, malt extract, sugar and powdered skimmed milk is reduced to a powder in the known type of vacuum evaporator.

*Second typical embodiment*

2 kilogrammes of sugar are added to 2 kilogrammes of coffee extract. The coffee extract is obtained in stages by successive lixiviations, as described in connection with the first typical embodiment. 500 grammes of full-cream milk-powder, 3 litres of milk concentrated to approximately 25° B. (Baumé) and 1½ litres of coffee extract concentrated to 10° B. (Baumé) are mixed together, being at the same time heated and stirred, and brought to a temperature of approximately 75° C., an alkalinely reacting reaction solution being added at the same time.

The reaction solution consists of approximately 25 grammes of sodium citrate, 75 grammes of sodium biphosphate and 9 grammes of acidum citricum. The result mixture is evaporated in vacuo and converted to a powder, as described in connection with the first typical embodiment.

The product obtained in accordance with the first typical embodiment is dissolved, for use, in hot milk, whilst that obtained in accordance with the second typical embodiment is dissolved in hot water and yields a milk-coffee ready for use. This latter, or the beverage yielded, is very nutritious thanks to its special composition and its enhanced milk content. Instead of coffee, tea can, as mentioned in connection with the first and second typical embodiments, be used for the manufacture of the flavouring extracts.

It goes without saying that caffein-free coffee can also be used for the production of the extracts mentioned in both the typical embodiments, in which case the final product is, needless to say, also caffein-free. In order to obtain a flavoured beverage of excellent quality, only the best types of coffee or tea are used in the manufacture of the products. It has proved advantageous to use coffees of different origins for the manufacturing process. In this case it is advisable to roast each variety of coffee separately. After the first extract has been prepared and pressed out, a further extract is made from the residues, whereby however only that quantity of water is added which the residues from the pressing process are able to absorb. A particularly effective method of enhancing the flavour consists in passing the sugared extract obtained over freshly roasted and ground coffee.

While the form of embodiment of the invention as herein disclosed, constitutes a preferred form, it is to be understood that some changes may be made in the arrangement, proceeding and combination of the various parts of my invention, and it is my intention to cover by my claims such changes as may reasonably be included within the scope thereof.

I claim as my invention:

1. A process for manufacturing a highly nutritious soluble product in powder form capable of yielding a beverage upon addition of aqueous liquids, which comprises the steps of lixiviating material selected from the group of coffee and tea with an aqueous solution of citric acid, concentrating the extract thus obtained, neutralizing said concentrate, adding sugar and milk to the neutralized extract, treating said extract with a weakly alkaline solution selected from the class consisting of sodium salts of organic acids and sodium salts of phosphoric acids, and mixtures thereof, and converting the treated extract into a dry powder.

2. A process for manufacturing a highly nutritious soluble product in powder form capable of yielding a beverage upon addition of aqueous liquids, which comprises the steps of lixiviating material selected from the group of coffee and tea with an aqueous solution of citric acid, concentrating the extract thus obtained, neutralizing said concentrate with sodium carbonate, adding sugar and milk to the neutralized extract, treating said extract with a weakly alkaline solution selected from the class consisting of sodium salts of organic acids and sodium salts of phosphoric acids and mixtures thereof, and converting the treated extract into a dry powder.

3. A process for manufacturing a highly nutritious soluble product in powder form capable of yielding a beverage upon addition of aqueous liquids, which comprises the steps of lixiviating material selected from the group of coffee and tea with an aqueous solution of citric acid, concentrating the extract thus obtained, neutralizing said concentrate, adding sugar and milk to the neutralized extract, treating said extract with a sodium biphosphate solution having a slightly alkaline reaction and converting the treated extract into a dry powder.

4. A process for manufacturing a highly nutritious soluble product in powder form capable of yielding a beverage upon addition of aqueous liquids, which comprises the steps of lixiviating material selected from the group of coffee and tea with an aqueous solution of citric acid, concentrating the extract thus obtained, neutralizing said concentrate, adding sugar and milk to the neutralized extract, treating said extract with a sodium salt solution of slightly alkaline reaction, said solution being a mixture of sodium biphosphate, sodium citrate, and citric acid.

5. A process according to claim 1, wherein the extract made from a materal selected from the group consisting of coffee or tea is obtained by a plurality of successive lixiviations and neutralizations.

6. A process for manufacturing a highly nutritious soluble product in powder form capable of yielding a beverage upon addition of aqueous liquids, which comprises the steps of lixiviating material selected from the group of coffee and tea with an aqueous solution of citric acid in a plurality of successive steps, wherein a first extract is produced by lixiviation of said material with a fresh solution of citric acid, said acid extract being neutralized with a basic sodium salt, and a plurality of further extracts are produced by adding further amounts of citric acid to each extract so far obtained and lixiviating therewith another batch of said material, neutralizing each extract as it is obtained, finally adding sugar and milk to the last extract, treating said extract with a weakly alkaline solution selected from the class consisting of sodium salts of organic acids and sodium salts of phosphoric acids, and mixtures thereof, and converting the so treated extract into a dry powder.

7. A process for manufacturing a highly nutritious soluble product in powder form capable of yielding a beverage upon addition of aqueous liquids, which comprises the steps of lixiviating material selected from the group of coffee and tea with an aqueous solution of citric acid in a plurality of successive steps, wherein a first extract is produced by lixiviation of said material with a fresh solution of citric acid, said extract being neutralized with sodium carbonate, and a plurality of further extracts are produced by adding further amounts of citric acid to each extract so far obtained and lixiviating therewith another batch of said material, neutralizing each extract as it is obtained, finally adding sugar and milk to the last extract, treating said extract with a weakly alkaline solution selected from the class consisting of sodium salts of organic acids and sodium salts or phosphoric acids and mixtures thereof, and converting the so treated extract into a dry powder.

8. A process for manufacturing a highly nutritious soluble product in powder form capable of yielding a beverage upon addition of aqueous liquids, which comprises the steps of lixiviating material selected from the group of coffee and tea with an aqueous solution of citric acid in a plurality of successive steps, wherein a first extract is produced by lixiviation of said material with a fresh solution of citric acid, said extract being neutralized with sodium carbonate, and a plurality of further extracts are produced by adding further amounts of citric acid to each extract so far obtained and lixiviating therewith another batch of said material, neutralizing each extract as it is obtained, finally adding sugar and milk to the last extract, treating said extract with a sodium biphosphate solution having a slightly alkaline reaction and converting the treated extract into a dry powder.

9. A process for manufacturing a highly nutritious soluble product in powder form capable of yielding a beverage upon addition of aqueous liquids, which comprises the steps of lixiviating material selected from the group of coffee and tea with an aqueous solution of citric acid in a plurality of successive steps, wherein a first extract is produced by lixiviation of said material with a fresh solution of citric acid, said extract being neutralized with sodium carbonate, and a plurality of further extracts are produced by adding further amounts of citric acid to each extract so far obtained and lixiviating therewith another batch of said material, neutralizing each extract as it is obtained, finally adding sugar and milk to the last extract, treating said extract with a sodium salt solution of slightly alkaline reaction, said solution being a mixture of sodium biphosphate, sodium citrate, and citric acid.

10. A process for manufacturing a highly nutritious soluble product in powder form capable of yielding a beverage upon addition of aqueous liquids, which comprises the steps of lixiviating in separate operations batches of different brands of coffee with aqueous solutions of citric acid, combining the extracts, concentrating the combined extracts, neutralizing said concentrate, adding sugar and milk to the neutralized extract, treating said extract with a weakly alkaline solution selected from the class consisting of sodium salts of organic acids and sodium salts of phosphoric acids, and mixtures thereof, and converting the treated extract into a dry powder.

11. A process according to claim 1, wherein milk is added in the form of powdered skimmed milk.

12. A process according to claim 1, wherein in addition to sugar and milk, full cream milk powder is added to the extract before treatment with said weakly alkaline solution.

13. A process according to claim 1, wherein in addition to sugar and milk, malt extract is added to the extract before treatment with said weakly alkaline solution.

FERDINAND NEEF.

REFERENCES CITED

The following references are of record in the file of this patent:

UNITED STATES PATENTS

| Number | Name | Date |
|---|---|---|
| 1,002,137 | Gandia | Aug. 29, 1911 |
| 1,381,821 | Greenberg | June 14, 1921 |

FOREIGN PATENTS

| Number | Country | Date |
|---|---|---|
| 18,612 | Great Britain | Jan. 10, 1907 |
| 26,292 | Great Britain | Nov. 11, 1897 |